Patented Apr. 16, 1935

1,997,602

UNITED STATES PATENT OFFICE 1,997,602

PROCESS OF REFINING MOLTEN METAL

Richard Robinson, Dormont, Pa., assignor, by mesne assignments, to Frank S. Christy and Nanette Christy, Crafton, Pa., as trustees for Arrar Corporation No Drawing. Application March 10, 1932, Serial No. 598,084

21 Claims. (Cl. 75—27)

This invention relates to a process for the purification of iron in a molten condition, the word "iron" as employed herein embracing not only steel but alloys of iron with other metals, such as nickel, chromium, copper, tungsten, manganese and molybdenum.

As is well known, iron (including steel and the alloys of iron as usually manufactured) contains impurities, resulting in a considerable proportion of loss due to the formation of blisters, seams, piping in ingots and skulls in the ladles.

A further and considerable loss is due to the lack of uniformity in the metal itself, even when obtained from the same heat.

I am enabled to overcome this lack of purity and uniformity in iron and its alloys by the process which will now be described in connection with the operation of open hearth furnaces, cupola furnaces, puddling furnaces and electrical furnaces, it being understood that my process is applicable to any grade of metal now being produced in the said furnaces as well as to molten iron in ladles.

In using my invention in connection with a reverberatory furnace, such as a puddling furnace, it will be understood that the metal is heated and worked in the usual manner. When the metal shall have been reduced to a molten condition, I then introduce into the same a flux consisting of dehydrated sal soda (sodium carbonate) and dehydrated saltpeter having admixed therewith fluor spar and charcoal, the proportion of charcoal employed being dependent upon the quality of the iron to be produced. In making the flux, I may use as high as 80 parts by weight of sal soda to 20 parts by weight of saltpeter, or 20 parts by weight of sal soda to 80 parts by weight of saltpeter. In practice, however, I have obtained best results by employing substantially equal parts by weight of these ingredients. The sal soda and saltpeter are preferably mixed together and are dehydrated, after which the mixture is ground to granules of about the size of rice or somewhat larger. The granules are then admixed with the fluor spar and the charcoal. For each ton of molten iron, I employ from 2 oz. to 3½ lbs. of the mixture of dehydrated sal soda and saltpeter, according to the quality of the pig iron employed in the puddling furnace, the mixture varying with the impurity of the pig iron; approximately 2½ lbs. to 7 lbs. of fluor spar; and approximately 1 lb. to 3½ lbs. of charcoal (dependent upon the character of the iron treated and the product desired). The less refined the pig iron obtained from the blast furnace and used in the puddling furnace, the more it is loaded with impurities, such as cinder, sulphur, phosphorus, metalloids, and gases deleterious to the metal, one instance of such gases being nitrogen; and the greater the proportion of the impurities to the pig iron, the greater will be the proportion of my aforesaid flux to the pig iron. In practice, I have thus far obtained the best results by using for each ton of molten pig iron of average quality approximately 1½ lbs. of the mixture of dehydrated sal soda and saltpeter, 5 lbs of fluor spar, and 2 lbs. of charcoal. In treating a batch of molten iron the total quantity of the mixture suitable therefor is divided into two substantially equal parts and, for convenience of handling, the mixture is placed in containers, such as bags. As soon as the iron is first thoroughly melted, half of the mixture is introduced into the furnace and the contents thereof thoroughly mingled with the metal. The mixture thus added produces an ebullition or fomentation in the molten iron, liberating gases therefrom and combining with and destroying the impurities therein. After this operation, the molten iron is fluxed with cinder in the usual manner and, at the conclusion of this "cindering up" operation, is brought to a boil, at which time the second portion of my mixture is introduced in the same manner as before and is thoroughly stirred up with the molten metal, the metal being worked thereafter in the usual manner.

Due to the two treatments, all gases are expelled from the metal and practically all of the impurities which are harmful to the metal are removed, the carbon in the mixture imparting the desired carbon content to the iron. Due to the reaction which occurs, the temperature of the molten metal is increased to a considerable extent over that due to the ordinary treatment and all of the ingredients which are added for the purpose of purifying the metal are consumed.

The success of my process depends upon the dehydration of the sal soda and saltpeter. Without such prior dehydration of these ingredients, the introduction of the mixture of the same into the molten metal would result in liberation of steam, which would bring the mixture up into the slag, and the mixture would be incapable of exerting the beneficial action desired upon the metal intended to be refined thereby. In fact, I have been able to refine the iron in a puddling furnace by using only these two dehydrated ingredients, as the active means for effecting such purification. When so used, it has been necessary to add an ingredient, which will not be detrimental to the iron but which will give such gravity to the mixture in each container as to enable it to pass through the slag and into the molten metal therebeneath. For this purpose, I have used iron scale instead of fluor spar. The proportions of dehydrated sal soda and dehydrated saltpeter per ton of iron will vary as pointed out hereinbefore in connection with the use of these ingredients with fluor spar and charcoal.

Reverberatory furnaces, such as open hearth furnaces, as is well known, are used for the production of steel, being heretofore considered impracticable for the production of iron. However, I am enabled to refine iron in an open hearth furnace to an extent which will require only a simple subsequent treatment in a puddling furnace, and accomplish this result in the following manner. The furnace is charged only with pig iron, scrap iron, and sufficient lime to serve as a flux. When the charge is melted, I introduce into the molten metal a flux consisting of a mixture of dehydrated sal soda and dehydrated saltpeter, together with fluor spar and charcoal. The proportions of the sal soda and saltpeter may vary with respect to each other to the extent pointed out hereinbefore in connection with the puddling furnace operation. The proportion of such mixture of dehydrated sal soda and saltpeter in the present instance may vary from 3 oz. to 1½ lbs. per ton of molten metal, according to the quality of the pig iron, as pointed out hereinbefore in connection with the use of my process in a puddling furnace; but I prefer to use with molten iron of average quality approximately 7 oz. of such mixture per ton of iron; the proportion of fluor spar per ton of metal may vary from 1½ lbs. per ton to 4½ lbs. per ton, but I prefer to employ with molten iron of average quality approximately 3 lbs. per ton; the proportion of charcoal per ton of molten metal may vary from ¼ oz. to 2 ozs. per ton, but I prefer to employ about ¾ oz. per ton of iron of average quality. My flux is introduced into the molten metal in one or more containers, care being taken that each container shall be introduced beneath the slag. An ebullition then occurs whereby the temperature of the molten metal is materially increased and the gases and impurities in the metal are consumed.

At the end of twenty minutes or a half hour after this treatment, the molten iron which has been thus treated is drawn off and is disintegrated or granulated by water, after which it is mixed with fluor spar in approximately the proportions of 2½ lbs. of fluor spar to 300 lbs. of disintegrated or granulated metal. The mixture of iron and fluor spar is then introduced into a puddling furnace and, when heated for a short time at the temperatures usually employed—say from twelve to twenty minutes—the iron, under the ordinary puddling treatment, assumes a spongy nature and is in condition to be worked. The fluor spar greatly shortens the time required for the treatment of the iron in the puddling furnace and also exercises a further refining action upon the same.

In using my process in connection with a cupola furnace, the furnace is charged in the usual manner with alternating layers of coke and steel or iron scrap and pig iron. In each layer of steel or iron scrap and pig metal, I place several metal containers each having therein a mixture of dehydrated sal soda and dehydrated saltpeter, together with fluor spar. The proportions of these ingredients which I prefer to use are 6 ozs. of the mixture of dehydrated sal soda and saltpeter per ton of metal and 3 lbs. of fluor spar per ton of metal. However, depending upon the proportion of scrap to pig metal, the mixture of dehydrated sal soda and dehydrated saltpeter may vary from 4 ozs. to 12 ozs. per ton and the proportions of sal soda and saltpeter may vary with respect to each other as pointed out hereinbefore. Furthermore, the proportions of fluor spar may vary from 1½ lbs. per ton of metal to 6 lbs. per ton of metal. The proportion of my fluxing mixture varies with the proportion of pig iron to scrap iron and with the impurities in the pig iron, increasing in accordance with the increase in the proportion of the pig iron to the scrap iron and in accordance with the increase in the proportion of the impurities in the pig iron to the pig iron itself.

The purpose of employing metal containers for the mixture is to prevent the mixture from being blown out by the blast during the process of melting the metal. As the molten metal is being drawn from the cupola into the ladle, fluor spar is introduced into the ladle in about the proportions of 2 lbs. of fluor spar per ton of molten metal. The molten metal in the cupola is purified to a greater extent than is the case with the molten metal which has been treated by my process as prescribed in connection with the open hearth furnace. The fluor spar effects a still further purification of the molten metal in the ladle; and further, due to the chemical reaction, raises the temperature of the metal in the ladle to an extent which prevents skulling and also produces a metal which is uniform throughout and which flows uniformly from the ladle and which is distributed uniformly throughout the molds.

Castings made from metal thus treated are entirely free from blisters and other defects which are inherent in castings produced in accordance with present cupola practice.

I will now describe my process as adapted for the production of steel castings and steel for rolling purposes in connection with a reverberatory furnace, such as an open hearth furnace.

In manufacturing steel for castings the open hearth furnace is charged in the usual manner with lime, scrap iron and pig iron, the lime being at the bottom. After the charge has been melted, I then introduce beneath the slag containers each having therein a mixture of dehydrated sal soda, dehydrated saltpeter, and fluor spar. The proportions of these ingredients per ton of molten metal are preferably as follows: dehydrated mixture 8 ozs. per ton; fluor spar, 3 lbs. per ton. It will be understood that the proportions of sal soda and saltpeter may vary with respect to each other as indicated hereinbefore. Furthermore, the proportions of the mixture of sal soda and saltpeter may vary from 4 ozs. per ton of molten metal to 2½ lbs. per ton of molten metal; and the fluor spar may vary from 1½ lbs. per ton of molten metal to 6 lbs. per ton of molten metal. The molten metal may then be drawn into ladles and treated with fluor spar in the same manner and in the same proportions and with the same advantages as set forth in connection with the treatment of metal drawn from cupola furnaces. I have also added to the ladles, in both the cupola furnace practice and the open hearth furnace practice just described, ½ lb. of mixture of dehydrated sal soda and saltpeter to each ten tons of metal, thereby insuring the purity and the fluidity of the metal and preventing any sculling in the ladles.

The fluor spar imparts sufficient gravity to the mixture of dehydrated sal soda and dehydrated saltpeter to enable the mixture to pass through the slag and into the molten metal therebeneath. In addition, wherever fluor spar is used in my processes described herein, it exercises a purifying effect upon the molten metal.

In manufacturing steel for mill or other commercial purposes in connection with an open hearth furnace, I proceed as follows: the open hearth furnace is charged with lime, pig iron and scrap iron and the charge is melted, which results in working the charge in the usual manner. Assuming that .15 carbon is desired in the finished product and the carbon in the charge is .25–.30, at this stage I introduce into the molten metal containers having therein a mixture of dehydrated sal soda and dehydrated saltpeter, together with fluor spar, dry iron ore, charcoal, preferably in substantially the following proportions by weight: 9 ozs. of the mixture of dehydrated sal soda and saltpeter per ton of molten metal; 3 lbs. of fluor spar per ton of molten metal; 5 lbs. of finely divided dry iron ore per ton of molten metal; charcoal approximately 1 oz. per ton of molten metal. The proportions of sal soda and saltpeter to each other may be varied as pointed out hereinbefore, and the proportions of the mixture per ton of molten metal may also vary in accordance with the quality of the furnace charge; for instance, with the ordinary proportions of pig iron and scrap iron in the charge, the mixture of sal soda and saltpeter may vary from 4 ozs. to 2½ lbs. per ton; the fluor spar may vary from 1½ lb. to 5 lbs. per ton; the iron ore from 3 lbs. to 8 lbs. per ton. After twenty to forty minutes following the introduction of my mixture into the molten metal, the metal will be purified by the chemical reaction of the mixture so introduced.

The object of employing dry iron ore with the mixture is to impart sufficient gravity to the same to insure that it will pass through the slag and to the bottom of the molten metal therebeneath, whereby the reaction begins at the bottom of the molten metal, with the evolution of great heat and the production of metal which is of uniform refined quality throughout the entire molten charge.

Instead of treating the molten meal in an open hearth furnace for the purpose of making castings, I may treat the molten metal, obtained by ordinary open hearth practice, in the ladle. In so doing, I introduce into the metal as it is being delivered into the ladle a mixture consisting of the following ingredients and preferably in the proportions stated: for each ton of molten metal, 8 ozs. of the mixture of dehydrated sal soda and saltpeter and 3 lbs. of fluor spar. The proportions of sal soda and saltpeter to each other may be varied as pointed out hereinbefore; and the proportions of the mixture of sol soda and saltpeter per ton of molten metal may vary from 4 ozs. to 12 ozs. and the proportions of the fluor spar to each ton of molten metal may vary from 1½ lbs. to 5½ lbs., dependent upon the quality of the molten iron treated.

In treating molten alloys of iron, I will use the same proportions of ingredients as specified hereinbefore, it being noted that the greater the specific gravity of the alloy the greater will be the proportions of the ingredients in the mixture. For instance, any of the alloys of iron may be produced during the operation of an open hearth furnace in the usual manner. This, however, will not interfere with the use of my process as described hereinbefore for the purpose of purifying the molten metal containing such alloy.

As pointed out hereinbefore, it is important that the sal soda and the saltpeter shall have been dehydrated before adding the same to the molten metal, since otherwise steam will be evolved therefrom upon their introduction into the metal, bringing the mixture of these ingredients up through the slag without the desired beneficial action therefrom upon the metal. Furthermore, by mixing the sal soda and saltpeter together before dehydration, a sem-liquid chemical and physical mixture or compound is produced which, when dried, possesses the combined properties of both of these ingredients; this treatment also insures a most intimate mixture of these ingredients which cannot be obtained by the separate dehydration and subsequent admixture thereof.

The reaction of my mixture of ingredients with the molten metal gives a violent ebullition in every case, liberating the harmful gases and consuming the impurities in the metal and these gases. There is also a material increase in the temperature of the molten metal in each case, resulting in a thinning or lightening of the slag, which permits the escape of the gases of combustion liberated from the molten metal.

While I have included one or more ingredients in addition to the dehydrated sal soda and dehydrated saltpeter in connection with the treatment of molten iron in the puddling furnace, in the cupola furnace, in the open hearth furnace, and in the ladle, it will be understood that a substantial purification of the molten iron may be obtained in each instance by using only the dehydrated sal soda and dehydrated saltpeter.

In every case where my mixture of dehydrated sal soda and dehydrated saltpeter is employed, the heat of the molten metal consumes the mixture slowly, but with the evolution of great heat which destroys or drives out the impurities in the metal. When fluor spar is admixed with the dehydrated sal soda and dehydrated saltpeter, the activity of the fluor spar and of the sal soda and saltpeter is increased.

The basic mixture of dehydrated sal soda and dehydrated saltpeter can, of course, be employed in the refining of iron produced in furnaces heated by electricity. The proportions of these ingredients and the presence or absence of the other ingredients mentioned will depend upon the particular kind of furnace employed and the particular character of the metal treated and of the metal desired in the final output.

Having thus described my invention, what I claim is:

1. The process of treating molten iron which consists in subjecting the same to the action of a flux containing substantially equal parts by weight of dehydrated sal soda and dehydrated saltpeter, together with fluor spar, the amount of fluor spar being not materially less than the combined weights of the dehydrated sal soda and dehydrated saltpeter.

2. The process of treating molten iron which consists in subjecting the same to the action of a mixture of dehydrated sal soda, dehydrated saltpeter and fluor spar in substantially the following proportions by weight per ton of molten iron:—

Dehydrated sal soda and dehydrated saltpeter_____ 2 ozs. to 3½ lbs.
Fluor spar_____ 1½ to 7 lbs.

3. The process of treating molten iron in a puddling furnace which consists in introducing into the same a flux of dehydrated sal soda and dehydrated saltpeter having fluor spar and charcoal admixed therewith.

4. The process of treating molten iron in a puddling furnace which consists in introducing into the same a flux consisting of dehydrated sal soda, dehydrated saltpeter, and charcoal in substantially the following proportions by weight per ton of molten iron:—

Dehydrated sal soda and dehydrated saltpeter _____ 2 ozs. to 3½ lbs.
Fluor spar _____ 2½ lbs. to 7 lbs.
Charcoal _____ 1 lb. to 3½ lbs.

5. The process of treating iron in a puddling furnace which consists first in melting the charge and then mixing thoroughly therewith approximately one half of a mixture of dehydrated sal soda, dehydrated saltpeter, fluor spar and charcoal, the admixture containing the ingredients mentioned in substantially the following proportions by weight per ton of molten iron:—

Dehydrated sal soda and dehydrated saltpeter _____ 2 ozs. to 3½ lbs.
Fluor spar _____ 2½ lbs. to 7 lbs.
Charcoal _____ 1 lb. to 3½ lbs.

fluxing the molten iron with cinder and bringing such iron to a boil; and adding the remainder of the aforesaid mixture to the molten iron and admixing the same with such iron.

6. The process of treating molten iron which consists in subjecting the same to the action of a mixture of dehydrated sal soda, dehydrated saltpeter and fluor spar in substantially the following proportions by weight per ton of molten metal:—

Dehydrated sal soda and dehydrated saltpeter _____ 2 ozs. to 3½ lbs.
Fluor spar _____ 1½ to 7 lbs.

the proportion of sal soda to saltpeter varying from 80 to 20 parts by weight of the former to 20 to 80 parts by weight of the latter.

7. The process of refining iron which consists in melting a charge of pig iron, scrap iron and limestone in an open hearth furnace; introducing into the molten metal, below the slag thereon, a flux consisting of a mixture of dehydrated sal soda, dehydrated saltpeter, fluor spar and charcoal; thereafter drawing off the molten iron and granulating or disintegrating the same with water; then mixing the disintegrated or granulated iron with fluor spar; and heating the final mixture in a puddling furnace.

8. The process of refining iron which consists in melting a charge of pig iron, scrap iron and limestone in an open hearth furnace; introducing into the molten metal, below the slag thereon, a flux consisting of a mixture of dehydrated sal soda, dehydrated saltpeter, fluor spar and charcoal in approximately the following proportions by weight per ton of molten iron:—

Dehydrated sal soda and dehydrated saltpeter _____ 3 ozs. to 1½ lbs.
Fluor spar _____ 1½ lbs. to 4½ lbs.
Charcoal _____ ¼ oz. to 2 ozs.

thereafter drawing off the molten iron and disintegrating the same with water; then mixing the disintegrated or granulated iron with fluor spar in the proportions of approximately 2½ lbs. of fluor spar to 300 lbs. of disintegrated or granulated iron and heating the resultant mixture in a puddling furnace.

9. The process of manufacturing steel for castings in an open hearth furnace which consists in charging said furnace with lime and iron; melting the charge; and then introducing beneath the slag thereon a mixture of dehydrated sal soda, dehydrated saltpeter, and fluor spar.

10. The process of manufacturing steel for castings in an open hearth furnace which consists in charging said furnace with lime and iron; melting the charge; and then introducing beneath the slag thereon a mixture of dehydrated sal soda, dehydrated saltpeter, and fluor spar, in substantially the following proportions by weight per ton of molten metal:—

Dehydrated sal soda and dehydrated saltpeter _____ 4 ozs. to 2½ lbs.
Fluor spar _____ 1½ lbs. to 6 lbs.

11. The process of manufacturing steel for castings in an open hearth furnace which consists in charging said furnace with lime and iron; melting the charge; and then introducing beneath the slag thereon a mixture of dehydrated sal soda, dehydrated saltpeter, fluor spar and tungsten, in substantially the following proportions by weight per ton of molten metal:—

Dehydrated sal soda and dehydrated saltpeter _____ 4 ozs. to 2½ lbs.
Fluor spar _____ 1½ lbs. to 6 lbs.
Tungsten _____ ½ lbs. to 40 lbs.

12. The process of manufacturing steel for castings which consists in charging an open hearth furnace with lime and iron; melting the charge; and then introducing beneath the slag thereon a mixture of dehydrated sal soda, dehydrated saltpeter and fluor spar in substantially the following proportions by weight per ton of molten metal:—

Dehydrated sal soda and dehydrated saltpeter _____ 4 ozs. to 2½ lbs.
Fluor spar _____ 1½ lbs. to 6 lbs.

drawing the molten metal thus treated into a ladle; and treating the molten metal in such ladle with fluor spar and with dehydrated sal soda and dehydrated saltpeter in substantially the proportions of 2 lbs. of fluor spar per ton of molten metal and approximately 1 oz. of dehydrated sal soda and dehydrated saltpeter per ton of molten metal.

13. The process of manufacturing steel for commercial purposes in connection with an open hearth furnace which comprises charging the furnace with lime and iron, and melting the charge; introducing into the molten metal, beneath the slag thereon, a mixture of dehydrated sal soda and dehydrated saltpeter, together with fluor spar, dry iron ore, and charcoal; and subjecting the molten metal to the action of the mixture introduced thereinto whereby the metal will be purified by the chemical reaction thereon of the said mixture.

14. The process of manufacturing steel for commercial purposes in connection with an open hearth furnace which comprises charging the furnace with lime and iron and melting the charge; introducing into the molten metal, beneath the slag thereon, containers having therein a mixture of dehydrated sal soda and dehydrated saltpeter, together with fluor spar, dry iron ore, and charcoal in approximately the following proportions by weight per ton of molten metal:—

Dehydrated sal soda and dehydrated saltpeter_____ 4 ozs. to 2½ lbs.
Fluor spar_____ 1½ lbs. to 5 lbs.
Dry iron ore_____ 3 lbs. to 8 lbs.

and subjecting the molten metal to the action of the mixture introduced thereinto whereby the metal will be purified by the chemical reaction thereon of the said mixture.

15. The process of treating molten iron in a ladle which consists in introducing into the metal, as it is being delivered into the ladle, a mixture consisting of dehydrated sal soda and dehydrated saltpeter and fluor spar, the amount of fluor spar being not materially less than the combined weights of the dehydrated sal soda and dehydrated saltpeter.

16. The process of treating molten iron in a ladle which consists in introducing into the metal, as it is being delivered into the ladle, a mixture consisting of the following ingredients in substantially the proportions stated per ton of molten metal:—

Dehydrated sal soda and dehydrated saltpeter_____ 4 ozs. to 12 ozs.
Fluor spar _____ 1½ lbs. to 5½ lbs.

17. The process of treating molten iron in a cupola furnace which consists in charging the same with alternating layers of fuel and iron introducing into each layer of the iron, containers having therein a mixture of dehydrated sal soda and dehydrated saltpeter and fluor spar, the proportions of the mixture per ton of metal being substantially as follows:—

Dehydrated sal soda and dehydrated saltpeter_____ 4 ozs. to 12 ozs.
Fluor spar _____ 1½ lbs. to 6 lbs.

18. The process of treating molten iron in a cupola furnace which consists in charging the same with alternating layers of fuel and iron introducing into each layer of the iron containers having therein a mixture of dehydrated sal soda and dehydrated saltpeter and fluor spar, the proportions of the mixture per ton of metal being substantially as follows:—

Dehydrated sal soda and dehydrated saltpeter_____ 4 ozs. to 12 ozs.
Fluor spar _____ 1½ lbs. to 6 lbs.

drawing the molten metal into a ladle; and introducing into the metal as it is being drawn into the ladle fluor spar in approximately the proportion of 2 lbs. of fluor spar per ton of metal.

19. The process of treating molten iron which consists in subjecting the same to the action of sal soda and saltpeter which have been mixed and dehydrated while so mixed.

20. The process of treating molten iron which consists in subjecting the same to the action of a flux comprising a mixture of fluor spar with sal soda and saltpeter which have been mixed and dehydrated while so mixed prior to their admixture with the fluorspar.

21. The process of treating molten iron which consists in subjecting the same to the action of a flux comprising a mixture of a relatively large proportion of fluor spar with sal soda and saltpeter which have been previously mixed and dehydrated while so mixed.

RICHARD ROBINSON.

CERTIFICATE OF CORRECTION.

Patent No. 1,997,602.  April 16, 1935.

RICHARD ROBINSON.

It is hereby certified that the name of the assignees in the above numbered patent should have been written and printed as "Frank S. Christy and Nanette Christy, of Crafton, Pennsylvania, as trustees for Arrar Company, as assignees by mesne assignments, instead of Frank S. Christy and Nanette Christy, of Crafton, Pennsylvania, as trustees for Arrar Corporation; and that the said Letters Patent should be read with this correction therein that the same may conform to the record of the case in the Patent Office.

Signed and sealed this 17th day of September, A. D. 1935.

Leslie Frazer (Seal)  Acting Commissioner of Patents.